3,336,288
MONO-AZO PIGMENTS
Emil Stocker, Riehen, and Kurt E. Burdeska, Basel, Switzerland, assignors to J. R. Geigy A.G., Basel, Switzerland
No Drawing. Filed Oct. 22, 1963, Ser. No. 318,077
Claims priority, application Switzerland, Nov. 30, 1962, 14,094/62
10 Claims. (Cl. 260—203)

The present invention concerns new azo pigments, a process for the production thereof, their use for the pigmenting of organic materials and, as industrial product the material pigmented therewith.

It has been found that valuable azo pigments are obtained if the diazonium compound of 4-chloro-3-aminobenzoic acid-2',4'-dichloroanilide is coupled with a 2-hydroxynaphthalene-3-carboxylic acid arylamide to form a compound of Formula I

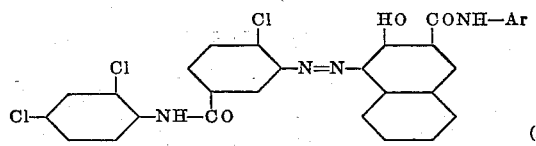

wherein Ar represents an unsubstituted or substituted radical of the benzene or naphthalene series.

Preferably Ar is an unsubstituted radical of the naphthalene series or a substituted radical of the benzene series. As substituents of Ar, mainly alkyl groups are mentioned, i.e. those having 1 to 4 carbon atoms such as the methyl, ethyl, propyl or isopropyl group, substituted, particularly halogen-substituted, alkyl groups such as the trifluoromethyl group, alkoxy groups, chiefly those containing 1 to 4 carbon atoms such as the methoxy, ethoxy or a propoxy group, or halogens such as fluorine, chlorine or bromine.

Particularly valuable pigments falling under the general Formula I which are distinguished by excellent fastness properties, especially fastness to heat, light, migration, rubbing and over lacquering are the compounds of the formula

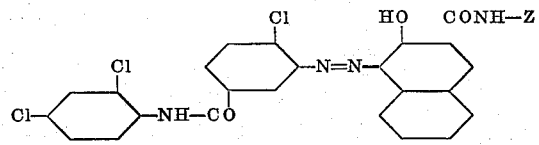

wherein Z is

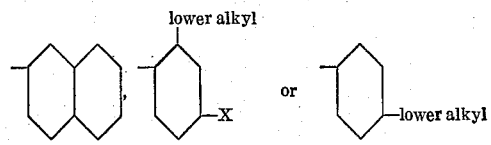

X being lower alkyl or lower alkoxy.

Pigments of very good fastness especially to light and rubbing are the compounds of the formula

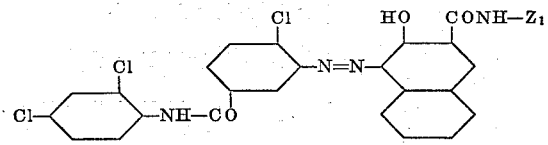

wherein $Z_1$ is naphthyl-(1)-, p-lower alkoxy-phenyl, o-lower alkoxy-phenyl, 2,5-di(lower alkyl)-phenyl, 3,4-di(lower alkyl)-phenyl, 3,5-di(lower alkyl)-phenyl, 2-lower alkyl-5-chloro-phenyl, 2-lower alkoxy-5-chlorophenyl, 2,4 - di(lower alkoxy) - 5 - chloro-phenyl, 2,5-di(lower alkoxy)-4-chloro-phenyl, or 2-lower alkyl-4-chloro-phenyl.

The 4-chloro-3-aminobenzoic acid-2',4'-dichloroanilide used according to the invention as diazo component is obtained by reacting 3-nitro-4-chlorobenzoyl chloride with 2,4-dichloro-aniline by known methods and then reducing the nitro group to the amino group. This amino compound is diazotised advantageously in a mixture of glacial acetic acid and hydrochloroic acid or in concentrated sulphuric acid.

The amides of 2-hydroxynaphthalene-3-carboxylic acid with an aromatic amine used as coupling components according to the invention are to some extent described in the literature; they are produced in the known manner, e.g. by reacting 2-hydroxy-naphthalene-3-carboxylic acid with the amine $Ar-NH_2$ in the presence of phosphorus trichloride as condensing agent.

The coupling of the diazonium compound of 4-chloro-3 - amino-benzoic acid-2',4' - dichloroanilide with the 2-hydroxy-naphthalene-3-carboxylic acid arylamide is generally performed in aqueous, preferably acid, solution, advantageously at a raised temperature and if necessary in the presence of an inert organic solvent or dispersing agent. Suitable organic solvents are, e.g. those miscible with water such as low alcohols, e.g. methanol, ethanol, ethylene glycol monomethyl or monoethyl ether, low ketones such as acetone or tertiary nitrogen bases such as pyridine or also dimethyl formamide, also certain organic solvents which are not miscible with water such as hydrocarbons which may be halogenated or nitrated, e.g. toluene, chlorobenzene or nitrobenzene. Suitable dispersing agents are, e.g. the reaction products of a multiple amount of the stoichiometrical amount of alkylene oxide, particularly ethylene oxide, with fatty alcohols or fatty acids, or condensation products of naphthalene sulphonic acids and formaldehyde.

The new azo pigments precipitate out of the reaction mixture immediately after the coupling. They can be worked up in the usual way, i.e. by filtering off, washing and drying, into dry powders. They are useful for many purposes as crude products but if desired they can be purified by an after-treatment. Often their shade, colour strength and their fastness properties to solvents, migration, cross-lacquering and, often also, to light can be further improved by heating in inert organic solvents, for example, in unhalogenated, halogenated or nitrated aromatic hydrocarbons or in certain organic nitrogen bases such as dimethyl aniline, dimethyl formamide, or pyridine. In addition, the pigments can be given a softer texture, if desired, by milling. They are milled either alone or in the presence of milling auxiliaries, e.g. in the presence of inorganic or organic salts which can be later removed with solvents and, sometimes, in the presence of organic solvents. Organic solvents which are solid or liquid at room temperature can be used for this purpose. For example, the pigment dyestuffs which have been isolated from the reaction mixture and dried are milled with dehydrated calcium chloride or with sodium sulphate or sodium chloride in the presence of aliphatic or aromatic, possibly chlorinated or nitrated, hydrocarbons such as cyclohexane, benzene, toluene, naphthalene, mono-, di- or tri-chlorobenzene, tetrachloro-ethane or nitrobenzene, lower aliphatic ketones such as acetone, or low aliphatic monoalcohols, e.g. methanol, ethanol or methoxy-ethanol or ethoxyethanol. In some cases, the pigments can also be finished by milling with organic solvents alone without the addition of salts. After milling, the auxiliaries are removed, for example inorganic salts are dissolved with water and organic auxiliaries are removed either by extraction, distillation or steam.

The azo pigments according to the invention are suitable for various purposes: for example, in printing inks for graphic purposes, in paints based on oil such as linseed oil paints or those based on water such as dispersion colours, in lacquers of various types such as, e.g. in nitro or stoving lacquers. In addition they can be used for the spin dyeing of viscose or cellulose acetate, for pigmenting synthetic resins such as polyethylene, polystyrene, polyvinyl chloride, which latter can also contain plasticisers, for the pigmenting of cellulose esters, resins which can be thermoset, or rubber, also for the colouring of paper pulp, paper laminate, for the coating of textiles and for the production of artificial leather, for pigment printing or pad dyeing of textiles. Artificial leather is also called leather cloth.

In these materials, the dyestuffs of Formula I according to the invention produce pure, vivid yellowish red pigmentations. Compared with previously known dyestuffs of similar constitution they are distinguished in that they combine the greatly sought after brilliant yellowish red shade with remarkable good fastness properties, in particular great fastness to light, good to very good fastness to migration in forms made from plasticised polyvinyl chloride, excellent fastness to cross-lacquering and good stability to heat.

Their fastness to migration as well as their great fastness to light in PVC sheets and foils containing plasticisers is particularly surprising as one or the other or both of these properties are lacking in previously known azo pigments having diazo components isomeric with 5(2',4'-dichlorophenylamino-carbonyl)-2-chlorophenyl diazo component of the pigments according to the invention. This is true in particular of those dyestuffs of Formula I according to the invention in which Ar is the 2-naphthyl, 2,4-dimethyl or 2-methyl-4-methoxyphenyl.

Further details can be seen from the following examples. Where not otherwise expressly stated, parts are given therein as parts by weight. The temperatures are in degrees Centigrade. The relationship of parts by weight to parts by volume is as that of grammes to cubic centimetres.

*Example 1*

6.31 parts of 4-chloro-3-aminobenzoic acid-2',4'-dichloroanilide are dissolved in 200 parts by volume of glacial acetic acid at 95° and then 60 parts by volume of 2 N hydrochloric acid are added at 60°. This solution is poured, while stirring well, into 200 parts of water at 10°, which latter contains 2 parts of the product of addition of 20 to 22 equivalents of ethylene oxide to dodecyl alcohol and 1.40 parts of sodium nitrite dissolved therein, and then 60 parts by volume of 2 N sodium acetate solution are added. A solution of 6.46 parts of 2-hydroxynaphthalene - 3 - carboxylic acid-2'-naphthalamide in 200 parts of water, 100 parts by volume of 2 N sodium hydroxide solution and 80 parts by volume of dimethyl formamide is then poured into the diazonium compound so prepared while stirring and the temperature is slowly raised to about 50° until the coupling is complete. The red pigment formed is filtered off, washed with water and dried at 60°. After pulverising, this crude product is boiled with 18 times the amount by weight of toluene for 15 minutes, filtered hot, washed with methanol and dried.

A valuable red pigment is obtained which has a pure yellowish shade when blended into paints, in lacquers it has good fastness to cross-lacquering and heat and in addition in polyvinyl chloride containing plasticisers possesses good fastness to migration, to heat and to rubbing and in both applications it has excellent fastness to light.

*Example 2*

6.31 parts of 4-chloro-3-aminobenzoic acid-2',4'-dichloroanilide are dissolved in 200 parts by volume of galacial acetic acid at 95°, the solution is allowed to cool to 60° and 60 parts of 2 N hydrochloric acid are added. This mixture is added, while stirring, to a 25° warm solution of 1.40 parts of sodium nitrite and 1.0 parts of an addition product of dodecyl alcohol and 21 equivalents of ethylene oxide in 1600 parts of water, the whole is heated to 45° and 60 parts by volume of 2 N sodium acetate solution are added. A solution of 6.00 parts of 2-hydroxynaphthalene-3-carboxylic acid-2',4'-dimethyl anilide in 100 parts by volume of dimethyl formamide is poured into the diazonium compound so obtained within 5 minutes while stirring and the whole is slowly heated to 55° until the coupling is complete. The pigment formed is filtered off, washed with water, dried and pulverised. It is then suspended in 18 times the amount of o-dichlorobenzene, the suspension is heated for 60 minutes to 140° then filtered, the product is washed with o-dichlorobenzene, dried and pulverised.

A brilliant yellowish red pigment is obtained which has great fastness to light. It is fast to cross-lacquering in, for example, stoving lacquers and in polyvinyl chloride containing plasticisers it has good fastness to migration.

Another red pigment of this class is obtained by using instead of 2-hydroxynaphthalene-3-carboxylic acid-2',4'-dimethyl anilide, 6.00 parts of 2-hydroxynaphthalene-3-carboxylic acid-2',5'-dimethyl anilide and otherwise following the same procedure.

*Example 3*

By repeating Example 1, in which the 6.46 parts of 2-hydroxynaphthalene - 3 - carboxylic acid-2'-naphthylamide mentioned are replaced by 6.34 parts of 2-hydroxynaphthalene - 3 - carboxylic acid-2'-methyl-4'-methoxyanilide and otherwise following the procedure given in Example 1, an equally light fast red pigment is obtained which is suitable, for example, for graphic inks or for the pigmenting of lacquers or of polyvinyl chloride containing plasticizers.

*Example 4*

On replacing the 6.46 parts of 2-hydroxynaphthalene-3-carboxylic acid-2'-naphthylamide in Example 1 by 5.74 parts of 2-hydroxynaphthalene-3-carboxylic acid - 4'-methyl anilide and otherwise following the same procedure, a very light fast red pigment is obtained which is suitable for graphic purposes and for the pigmenting of lacquers.

*Example 5*

Another valuable red pigment which is suitable for graphic purposes and for the pigmenting of lacquers is obtained if the 6.46 parts of 2-hydroxynaphthalene-3-carboxylic acid-2'-naphthylamide mentioned in Example 1 are replaced by 6.08 parts of 2-hydroxynaphthalene-3-carboxylic acid-4'-methoxyanilide.

If, in this example, instead of the 6.08 parts of 2-hydroxynaphthalene-3-carboxylic acid - 4'-methoxyanilide, equivalent amounts of 2-hydroxynaphthalene-3-carboxylic acid-2'-methyl-4'-chloroanilide,
2-hydroxynaphthalene-3-carboxylic acid-2'-methoxy-5'-chloroanilide,
2-hydroxynaphthalene-3-carboxylic acid-2'-ethoxyanilide,
2-hydroxynaphthalene-3-carboxylic acid-3'-4'-dimethylanilide,
2-hydroxynaphthalene-3-carboxylic acid-3',5'-dimethylanilide,
2-hydroxynaphthalene-3-carboxylic acid-2'-methyl-5'-chloroanilide,
2-hydroxynaphthalene-3-carboxylic acid-2',4'-dimethoxy-5'-chloroanilide,
2-hydroxynaphthalene-3-carboxylic acid-2',5'-dimethoxy-4'-chloroanilide or
2-hydroxynaphthalene-3-carboxylic acid-1'-naphthylamide are used, then almost equally valuable yellowish red pigments are obtained.

Example 6

A stoving lacquer made from:

20 parts of titanium dioxide (rutil),
40 parts of a 60% solution of a coconut alkyl resin in xylene (oil content of the resin 32%),
24 parts of a 50% solution of a melamin resin in butanol,
8 parts of xylene,
7 parts of ethylene glycol monomethyl ether, and
1 part of the pigment according to Example 2, is finely ground in a ball mill and sprayed onto an aluminium sheet, allowed to dry and then stoved for 30 minutes at 120° C. The pure yellowish red dyeing has excellent fastness to light, cross-lacquering and heat.

Example 7

A stabilised mixture of 67 parts of polyvinyl chloride,
33 parts of dioctyl phthalate,
2 parts of dibutyl tin dilaurate,
2 parts of titanium dioxide, and
0.65 part of the pigment according to Example I is worked up on a set of mixing rollers at 160° and then drawn out into a foil of 0.4 mm. thickness. The pure yellowish red dyeing has very good migration, light, rubbing and heat fastness properties.

Example 8

A graphic ink is produced on a set of three mixing rollers from:

10 parts of the pigment according to Example 2, paragraph 1,
30 parts of hydrate of alumina, and
60 parts of varnish.

The prints obtained in the book-printing process therewith are distinguished by a beautiful yellowish red shade, good fastness to solvents and excellent fastness to light.

What we claim is:

1. A compound of the formula

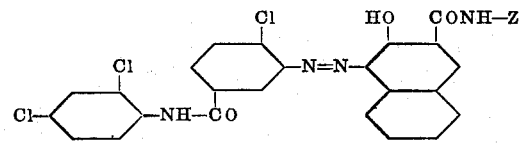

wherein Z is a member selected from the group consisting of

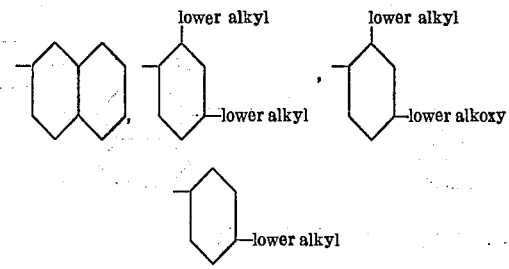

2. A compound of the formula

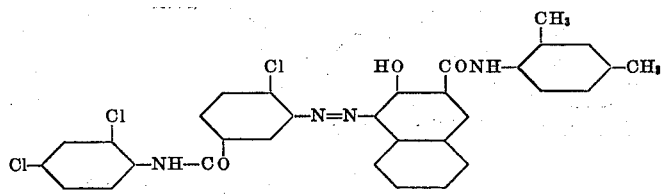

3. A compound of the formula

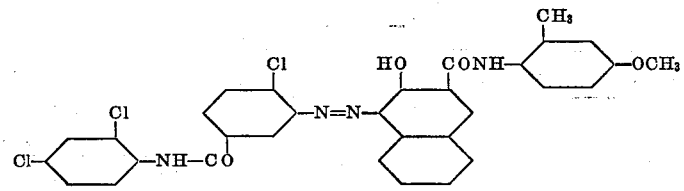

4. A compound of the formula

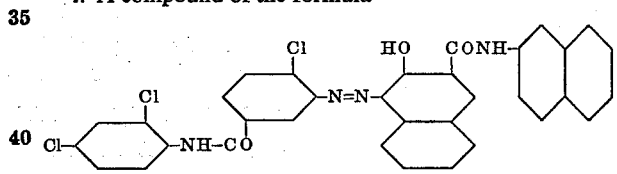

5. A compound of the formula

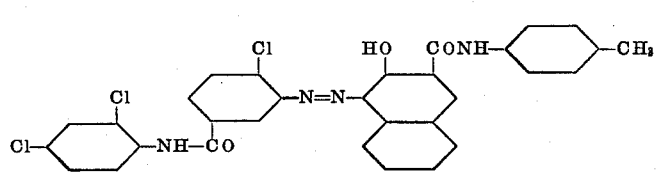

6. A compound of the formula

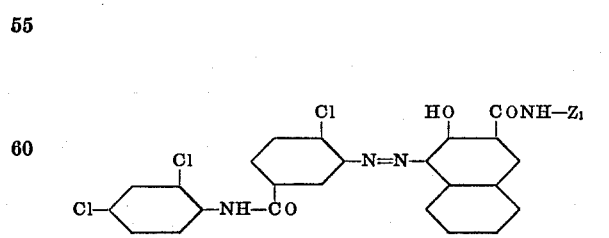

wherein $Z_1$ is a member selected from the group consisting of naphthyl-(1)-, p-lower alkoxy-phenyl, o-lower alkoxy-phenyl, 2,5-di(lower alkyl)-phenyl, 3,4-di(lower alkyl)-phenyl, 3,5-di(lower alkyl)-phenyl, 2-lower alkyl-5-chloro-phenyl, 2-lower alkoxy-5-chloro-phenyl, 2,4-di(lower alkoxy)-5-chloro-phenyl, 2,5-di(lower alkoxy)-4-chloro-phenyl, and 2-lower alkyl-4-chloro-phenyl.

7. A compound of the formula
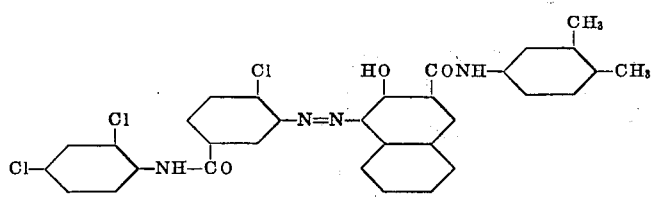
8. A compound of the formula
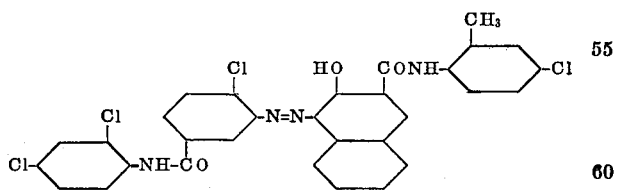
9. A compound of the formula
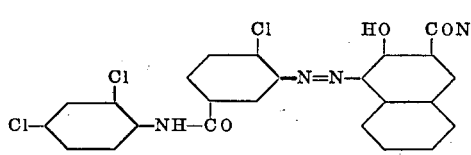
10. A compound of the formula
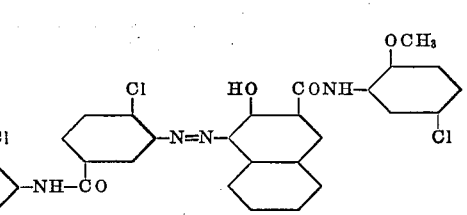
References Cited
UNITED STATES PATENTS
2,703,319   3/1955   Fischer et al. _____ 260—203
OTHER REFERENCES
Lubs, Chemistry of Synthetic Dyes and Pigments, Rheinhold Publishing Corp., 1955. TP 913 L8, p. 671.
CHARLES B. PARKER, *Primary Examiner.*
D. M. PAPUGA, *Assistant Examiner.*